US009755825B2

(12) United States Patent
O'Brien et al.

(10) Patent No.: US 9,755,825 B2
(45) Date of Patent: Sep. 5, 2017

(54) DEVICE AUTHENTICATION AND SECURE CHANNEL MANAGEMENT FOR PEER-TO-PEER INITIATED COMMUNICATIONS

(75) Inventors: William G. O'Brien, Nanaimo (CA); Tet Hin Yeap, Ottawa (CA); Dafu Lou, Nepean (CA)

(73) Assignee: BCE INC., Montreal (CA)

(*) Notice: Subject to any disclaimer, the term of this patent is extended or adjusted under 35 U.S.C. 154(b) by 1261 days.

(21) Appl. No.: 11/961,219

(22) Filed: Dec. 20, 2007

(65) Prior Publication Data

US 2008/0235511 A1 Sep. 25, 2008

(30) Foreign Application Priority Data

Dec. 21, 2006 (CA) .................................... 2571891

(51) Int. Cl.
*H04L 9/32* (2006.01)
*H04L 9/08* (2006.01)
*H04L 29/06* (2006.01)

(52) U.S. Cl.
CPC .......... *H04L 9/0844* (2013.01); *H04L 63/061* (2013.01); *H04L 63/045* (2013.01); *H04L 63/0435* (2013.01); *H04L 63/062* (2013.01); *H04L 65/1069* (2013.01); *H04L 65/1073* (2013.01)

(58) Field of Classification Search
CPC .......................... H04L 9/3223; H04L 63/0428
USPC ........................................................ 713/171
See application file for complete search history.

(56) References Cited

U.S. PATENT DOCUMENTS

| 6,732,269 | B1* | 5/2004 | Baskey et al. ................. 713/153 |
| 6,851,053 | B1* | 2/2005 | Liles et al. ..................... 713/168 |
| 7,260,834 | B1* | 8/2007 | Carlson ............................. 726/4 |
| 7,506,368 | B1* | 3/2009 | Kersey ................ H04L 63/0428 726/12 |
| 7,535,905 | B2* | 5/2009 | Narayanan ............ H04L 63/126 370/392 |
| 8,874,771 | B2* | 10/2014 | Munger ............ H04L 29/12216 709/230 |
| 8,943,201 | B2* | 1/2015 | Larson .............. H04L 29/12216 709/225 |

(Continued)

FOREIGN PATENT DOCUMENTS

WO 03/047154 A1 6/2003

*Primary Examiner* — Krista Zele
*Assistant Examiner* — Tariq Najee-Ullah
(74) *Attorney, Agent, or Firm* — Borden Ladner Gervais LLP; Curtis Behmann

(57) ABSTRACT

A method and system for providing secure access to a device initiating communications using a peer-to-peer signaling protocol, such as a SIP or H.323. In a device registration phase, the device contacts a secure access server, and authenticates to the secure access server by providing an identification, such as its factory ID. The secure access server then issues a device ID and private key to the authenticated device. A client can then initiate a further communication session and be authenticated by the secure access server. The secure access server returns the device identification and the device's public key to the client. The client and device can then perform a symmetrical key exchange for their current communication session, and can communicate with appropriate encryption. The device's private key can be set to expire after one or more uses.

7 Claims, 8 Drawing Sheets

(56) References Cited

U.S. PATENT DOCUMENTS

| | | | |
|---|---|---|---|
| 2002/0013772 A1* | 1/2002 | Peinado | G06F 21/10 705/51 |
| 2002/0065785 A1* | 5/2002 | Tsuda | 705/67 |
| 2002/0078345 A1* | 6/2002 | Sandhu | H04L 9/0825 713/155 |
| 2002/0078353 A1* | 6/2002 | Sandhu | H04L 9/3249 713/170 |
| 2002/0078354 A1* | 6/2002 | Sandhu | H04L 9/0802 713/171 |
| 2002/0129236 A1* | 9/2002 | Nuutinen | H04L 63/0428 713/151 |
| 2003/0070080 A1* | 4/2003 | Rosen | 713/187 |
| 2003/0079143 A1* | 4/2003 | Mikel | H04L 63/0428 726/8 |
| 2003/0115452 A1* | 6/2003 | Sandhu | H04L 63/045 713/155 |
| 2003/0188180 A1* | 10/2003 | Overney | H04L 9/0869 713/193 |
| 2004/0003246 A1 | 1/2004 | Hopkins et al. | |
| 2004/0139028 A1* | 7/2004 | Fishman | G06Q 20/341 705/67 |
| 2004/0225878 A1* | 11/2004 | Costa-Requena et al. | 713/150 |
| 2004/0243712 A1* | 12/2004 | Sakai et al. | 709/227 |
| 2005/0021477 A1* | 1/2005 | Krishnan et al. | 705/64 |
| 2005/0027985 A1* | 2/2005 | Sprunk et al. | 713/171 |
| 2005/0094581 A1* | 5/2005 | Giloi et al. | 370/260 |
| 2005/0144468 A1* | 6/2005 | Northcutt et al. | 713/189 |
| 2005/0174937 A1* | 8/2005 | Scoggins | H04M 7/006 370/230 |
| 2005/0220095 A1* | 10/2005 | Narayanan | H04L 63/126 370/389 |
| 2005/0271207 A1* | 12/2005 | Frey | 380/263 |
| 2006/0005018 A1 | 1/2006 | Alculumbre | |
| 2006/0046714 A1* | 3/2006 | Kalavade | 455/428 |
| 2006/0080702 A1* | 4/2006 | Diez et al. | 725/30 |
| 2006/0095766 A1* | 5/2006 | Zhu | H04L 9/0844 713/168 |
| 2006/0136964 A1* | 6/2006 | Diez et al. | 725/37 |
| 2006/0212933 A1* | 9/2006 | Scoggins | H04L 63/0428 726/11 |
| 2006/0274899 A1* | 12/2006 | Zhu et al. | 380/281 |
| 2007/0043942 A1* | 2/2007 | Wong | G06F 21/6209 713/151 |
| 2007/0058815 A1* | 3/2007 | Kwak et al. | 380/286 |
| 2007/0074282 A1* | 3/2007 | Black et al. | 726/14 |
| 2007/0133803 A1* | 6/2007 | Saito et al. | 380/267 |
| 2007/0147619 A1* | 6/2007 | Bellows et al. | 380/277 |
| 2007/0206797 A1* | 9/2007 | Chan et al. | 380/270 |
| 2007/0206799 A1* | 9/2007 | Wingert | G06F 21/10 380/285 |
| 2008/0044032 A1* | 2/2008 | Lou | H04L 63/0442 380/284 |
| 2008/0126794 A1* | 5/2008 | Wang et al. | 713/151 |
| 2010/0293095 A1* | 11/2010 | Adkins et al. | 705/50 |

* cited by examiner

DEVICE AUTHENTICATION AND SECURE CHANNEL MANAGEMENT FOR PEER-TO-PEER INITIATED COMMUNICATIONS

FIELD OF THE INVENTION

The present invention relates generally to establishing secure communication channels. More particularly, the present invention relates to providing authentication and security for communications between devices communicating across an Internet Protocol (IP) network using a Session Initiation Protocol (SIP).

BACKGROUND OF THE INVENTION

Session Initiation Protocol (SIP) is an Internet Engineering Task Force (IETF) peer-to-peer, signaling protocol that facilitates openness, connectivity, choice and personalization. Initially designed to support multicast applications, the simplicity, power and extensibility of SIP have lead to its rapid adoption for other uses, notably Voice over Internet Protocol (VoIP), and Instant Messaging (IM). SIP can set up and manage communication sessions, regardless of the media type (e.g. voice, text, video, or data). In addition to voice communication features, SIP enables new services that are difficult or impossible to provide in traditional telephony-centric systems, such as presence; mobility; user-defined personalized services; instant multimedia communications; advanced multimedia conferencing; and multiple devices. Due to its ease of use and platform-independent nature, more devices, such as video surveillance cameras, are now SIP-based and can be accessed over the Internet.

A SIP-based video surveillance system can include many cameras distributed over a wide geographic area. In order to effect surveillance, cameras must by queried or polled by a user or client to retrieve video and other information. The cameras should only be accessible to authorized users; therefore, it is desirable to provide secure communication channels over which a user can access one of more cameras or other devices. Due to the large amount of video and other data that it may be necessary to transmit, it is also desirable that the secure communication channel permit high-bandwidth communications. A disadvantage of SIP is its inherent lack of authentication and security features. Public key, symmetric key and other security methods have been proposed, but all suffer disadvantages, particularly when used with always-on type devices, such as video surveillance cameras.

Public key, or asymmetric key, cryptography allows users and devices to communicate securely without having prior access to a shared secret key. This is achieved by providing a pair of cryptographic keys, designated as a public key and a private key, which are related mathematically. In public key cryptography, the private key is generally kept secret, while the public key can be widely distributed. In a general sense, one key locks a lock; while the other is required to unlock it. There are many forms of public key cryptography, such as public key encryption and public key digital signing. Digital certificates and public key infrastructure (PKI) technologies are two public key technologies that provide authentication and strong data encryption, and are commonly employed for secure transmission between two endpoints. However, they are computationally intensive and relatively slow. In addition, they are cumbersome to manage, since the public and private key pairs or digital certificates must be generated and stored for every device. The keys or digital certificates must also be regularly updated if they are not to be maliciously intercepted and broken.

Symmetric key systems are much less computationally expensive than asymmetric key systems. In practice, an asymmetric key algorithm is hundreds or thousands of times slower than a symmetric key algorithm. Symmetric key systems use related cryptographic keys for both decryption and encryption. The encryption key is trivially related to the decryption key, in that it may be identical or there is a simple transform to go between the two keys. The keys, in practice, represent a shared secret between two or more parties that can be used to maintain a private information link. Other terms for symmetric key encryption include single-key, one-key and private-key encryption (which should not be confused with the private key in public key cryptography). Symmetric key algorithms can be divided into stream ciphers and block ciphers. The Advanced Encryption Standard (AES) algorithm, which encrypts data as 128-bit blocks, is a commonly used symmetric block cipher. Other examples of symmetric key algorithms include Twofish, Serpent, Blowfish, CAST5, RC4, TDES, and IDEA. However, a disadvantage of symmetric key algorithms is the requirement of a shared secret key, with one copy at each end. Since keys are subject to potential discovery by a cryptographic adversary, they need to be changed frequently and kept secure during distribution and in service. The consequent requirement to choose, distribute and store keys without error and without loss, known as key management, can also be difficult to reliably achieve. In addition, symmetric key algorithms cannot be used for authentication or non-repudiation purposes.

It is, therefore, desirable to provide a fast, scalable, and less computationally intensive system and method to authenticate, and provide a secure communication channel between, devices initiating communications according to a peer-to-peer signaling protocol, such as SIP.

SUMMARY OF THE INVENTION

In a first aspect, the present invention provides a method of establishing a secure communication channel between devices in an Internet Protocol (IP) network. The method comprises providing a private key to an authenticated device, in session established in accordance with a peer-to-peer signaling protocol. In a further session established in accordance with the peer-to-peer signaling protocol, a complimentary public key is provided to an authenticated client requesting secure access to the device. The private key and complimentary public key permit a key exchange between the authenticated device and the authenticated client, to establish the secure communication channel therebetween.

According to embodiments, the method can further comprise generating the private key and the complimentary public key. Generating the private key and the complimentary public key can comprise generating asymmetric private and public keys. The method can also comprise authenticating a device to provide the authenticated device, and authenticating a client to provide the authenticated client. The step of permitting the key exchange can comprise permitting a symmetric key exchange between the authenticated device and the authenticated client, such as to establish an Advanced Encryption Standard (AES) tunnel or a high-bandwidth secure communication tunnel. The method can further comprise providing a new private key to the authenticated device upon expiry of the private key, where the expiry occurs at the end of the further communication session or periodically.

In a further aspect, the present invention provides a method of securely accessing a device in a communication session established according to a peer-to-peer signaling protocol. The method comprises initiating a communication session with a secure access server in accordance with the peer-to-peer signaling protocol. The secure access server is then authenticated, and a public key for the device is retrieved from the secure access server. A further communication session is then initiated with the device in accordance with a peer-to-peer signaling protocol, and a key exchange is performed with the device using the public key to establish a secure communication channel with the device.

According to embodiments of the method, authenticating to the secure access server can comprise providing an encrypted user identification and device identification to the secure access server. Providing the encrypted user identification and SIP device identification to the secure access server can comprise encrypting the user identification and SIP device identification with a public key associated to the secure access server. Performing the key exchange with the device can comprise performing a symmetric key exchange to establish, for example, an AES tunnel or a high-bandwidth secure communication channel with the device.

In a further aspect, the present invention provides a method for providing authentication of, and secure communication between, devices communicating over an IP network according to a peer-to-peer signaling protocol. The method comprises authenticating a device agent and providing it with a private key. A client agent is then authenticated and provided with a public key, complimentary to the private key. In a communication session established between the client agent and the device agent according to the peer-to-peer signaling protocol, an encrypted key exchange is performed to establish a secure tunnel therebetween.

According to an embodiment, authenticating the device agent can comprise establishing a communication session between the device agent and a secure access server, in accordance with the peer-to-peer signaling protocol. The symmetric key exchange is then performed to provide a symmetric key to the device agent and the secure access server. The device agent is then authenticated on receipt of a device identification encrypted with the symmetric key. Private and public keys are then generated in response to successful authentication of the device agent; and the private key, encrypted in accordance with the symmetric key, is provided to the device agent. Authenticating the client agent can comprise establishing a communication session between the client agent and a secure access server, according to the peer-to-peer signaling protocol, then authenticating the client agent on receipt of a user identification and a device identification encrypted with a public key associated to the secure access server; and providing the public key, encrypted with a client public key, to the client agent.

According to further embodiments, the method can further comprise re-authenticating the device agent and providing it with a new private key upon expiry of the private key, such as at the end of the communication session established between the device agent and the client agent or periodically. The encrypted key exchange can comprise a symmetric key exchange, such as for establishing an AES tunnel or a high-bandwidth communication tunnel.

In a further aspect, the present invention provides a system for providing secure communication between devices initiating communication over an IP network according to a peer-to-peer signaling protocol. The system comprises a secure access server communicating with the devices via a server connected to the IP network. The secure access server has an authenticator to authenticate the devices and a key generation module to generate complimentary asymmetric public and private keys in response to authentication of a device agent to the secure access server and to provide the private key to the device agent. The system further comprises a client agent authenticated to, and provided with the public key by, the secure access server. The client agent is for initiating a communication session with the device agent and, using the public key, performing a further key exchange therewith to establish a secure communication tunnel.

According to embodiments, the secure access server can be encompassed within an authentication system, such as an authentication, authorization and accounting (AAA) server. The further key exchange can comprise a symmetric key exchange. The secure communication tunnel can be an AES tunnel or other high-bandwidth secure communication tunnel. The devices can be SIP-based devices and the peer-to-peer signaling protocol SIP, or they can be H.323-based devices and the peer-to-peer signaling protocol H.323.

According to yet another aspect, the present invention provides a system for authenticating devices and establishing a secure communication tunnel between them. The system comprises a server in communication with a public Internet Protocol (IP) network; a secure access server in communication with the server; a device agent, in communication with the server according to a peer-to-peer signaling protocol, to authenticate itself to the secure access server and to receive a private key from the secure access server; and a client agent, in communication with the server according to the peer-to-peer signaling protocol, to authenticate itself to the secure access server, to receive a complimentary public key from the secure access server, and, using the public key, performing a further key exchange with the device agent to establish a secure communication tunnel.

According to embodiments, the secure access server can be encompassed within an authentication system, such as an authentication, authorization and accounting (AAA) server. The secure access server can comprise an authenticator to authenticate the device agent and the client agent, and a key generation module to generate the private and public keys. The further key exchange can comprise a symmetric key exchange. The secure communication tunnel can be an AES tunnel or other high-bandwidth secure communication tunnel.

According to each aspect of the present invention, the peer-to-peer signaling protocol can be Session Initiation Protocol (SIP) or H.323.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, according to non-limiting embodiments, the present invention provides a method and system for providing secure access to a device initiating communications using a peer-to-peer signaling protocol, such as a Session Initiation Protocol (SIP) or H.323. In a device registration phase, the device contacts a secure access server (SAS), via a server connected to an Internet Protocol (IP) network, and authenticates to the SAS by providing a registration identification (ID), such as its factory ID. The SAS then issues a device ID and private key to the authenticated device. When a user, or client, wishes to contact the device, the client initiates a further communication session and is authenticated by the SAS. The SAS returns the device identification and the device's public key to the client. The client and device can then perform a symmetrical key exchange for their current communication session, and can communicate with appropriate encryption. The device's private key can be set to expire after one or more uses, at which time the device can request, or be provided with, a new private key.

Figure 1:
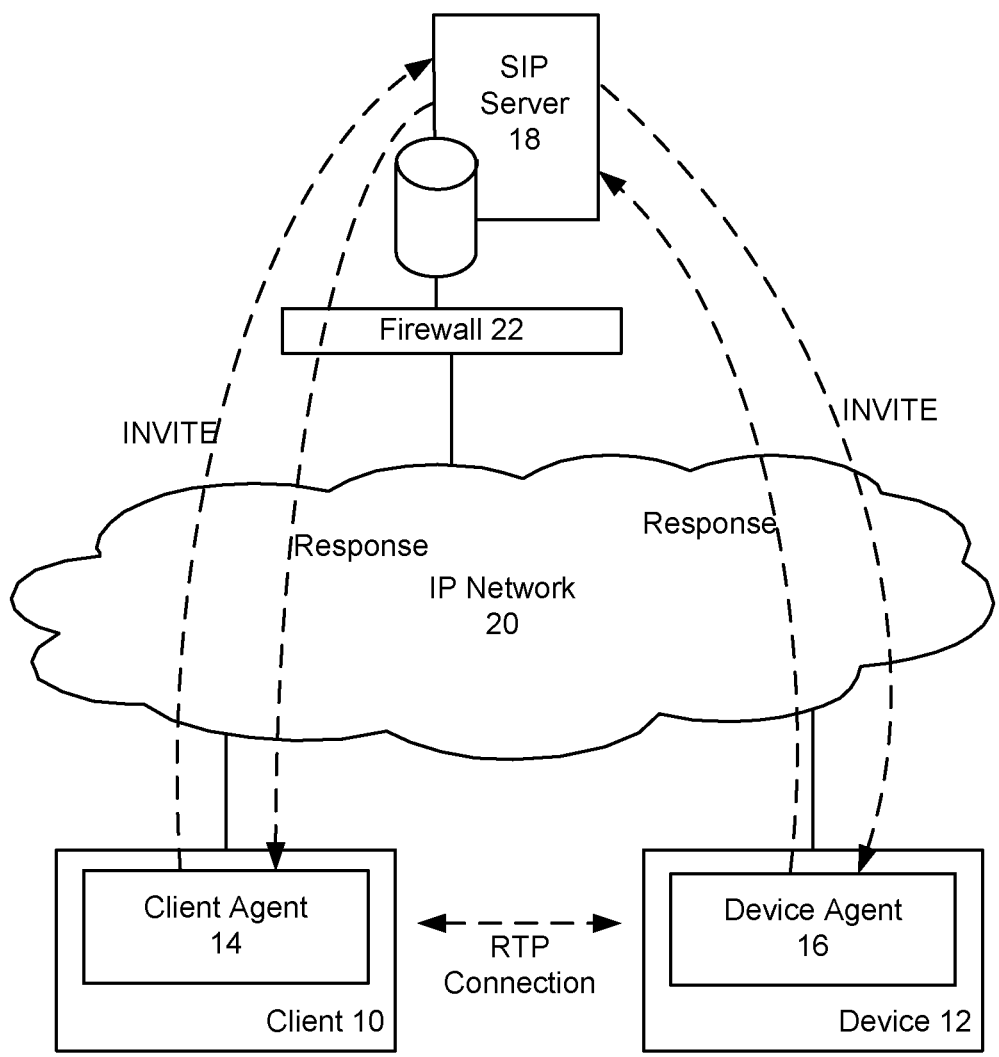
FIG. 1 shows a conventional SIP architecture.

FIG. 1 depicts a SIP-based architecture. A calling party 10, here termed the client, and a called party 12, here termed the device, are shown. User agents, termed here the client agent 14 and device agent 16, respectively, are the respective endpoints in the SIP network. User agents, such as the client agent 14 and device agent 16, are software entities resident on, and controlling, hardware devices that can include: SIP phones (hard sets), laptop and desktop computers or PDAs with a SIP client (e.g., softphone), media gateways (e.g. T1/E1 gateway), access gateways (e.g., FAX gateway), conferencing systems, and other IP-enabled devices, such as surveillance cameras. While the present invention will be described with relation to SIP-based clients and devices, such as SIP-based digital surveillance cameras, it will be appreciated that the invention can be applied to any communication devices initiating communications using a peer-to-peer signaling protocol, such as SIP or H.323, particularly devices that require high-bandwidth secure communication channels for efficient data retrieval, such as IP-based surveillance cameras.

The client agent 14 and device agent 16 can originate and terminate calls or media sessions (voice, video, data, etc.). The client agent 14 and device agent 16 communicate with SIP servers, such as SIP server 18, which can be any suitable computing device capable of interfacing with a packet-based network, such as a Transmission Control Protocol/Internet Protocol (TCP/IP) network 20. SIP server 18 is generally protected from unauthorized access by a firewall or other protection mechanism, such as firewall 22.

The application software embodying the user agents and the server functionality can be provided on any suitable computer-useable medium for execution by a microprocessor in the user device, such as CD-ROM, hard disk, read-only memory, or random access memory. The application software can be written in a suitable programming language, such as C++.

As is well known, a SIP server can include a number of elements, including proxy servers, redirect servers and a SIP registrar (not shown). Proxy servers perform signaling and relay functions. In other words, they determine where to send signaling messages and forward requests on behalf of a user agent. To do so, they consult appropriate databases, such as Domain Name Servers (DNS) and location servers. The SIP registrar maintains user location information in a database, and the redirect servers redirect SIP requests to other device associated to the user, as appropriate.

SIP is designed such that user agents can discover and negotiate their capabilities. There are two types of SIP messages: SIP requests and SIP responses. SIP requests include: INVITE—to initiate a session; REGISTER—to bind a permanent address to a current location; SUBSCRIBE—to subscribe to a service state change; and NOTIFY—to notify a change of service state (e.g., new voice message). SIP responses are numeric codes set out in the appropriate standards. A SIP message can also contain media session information in Session Description Protocol (SDP), which determines on what type of media (e.g. audio, video, etc.) the communication session will be realized. Once the client agent 14 and device agent 16 have successfully negotiated a session through a series of SIP requests and responses, the actual video, voice or other communication occurs over a Real-time Transport Protocol (RTP) connection set up between them.

Figure 2:
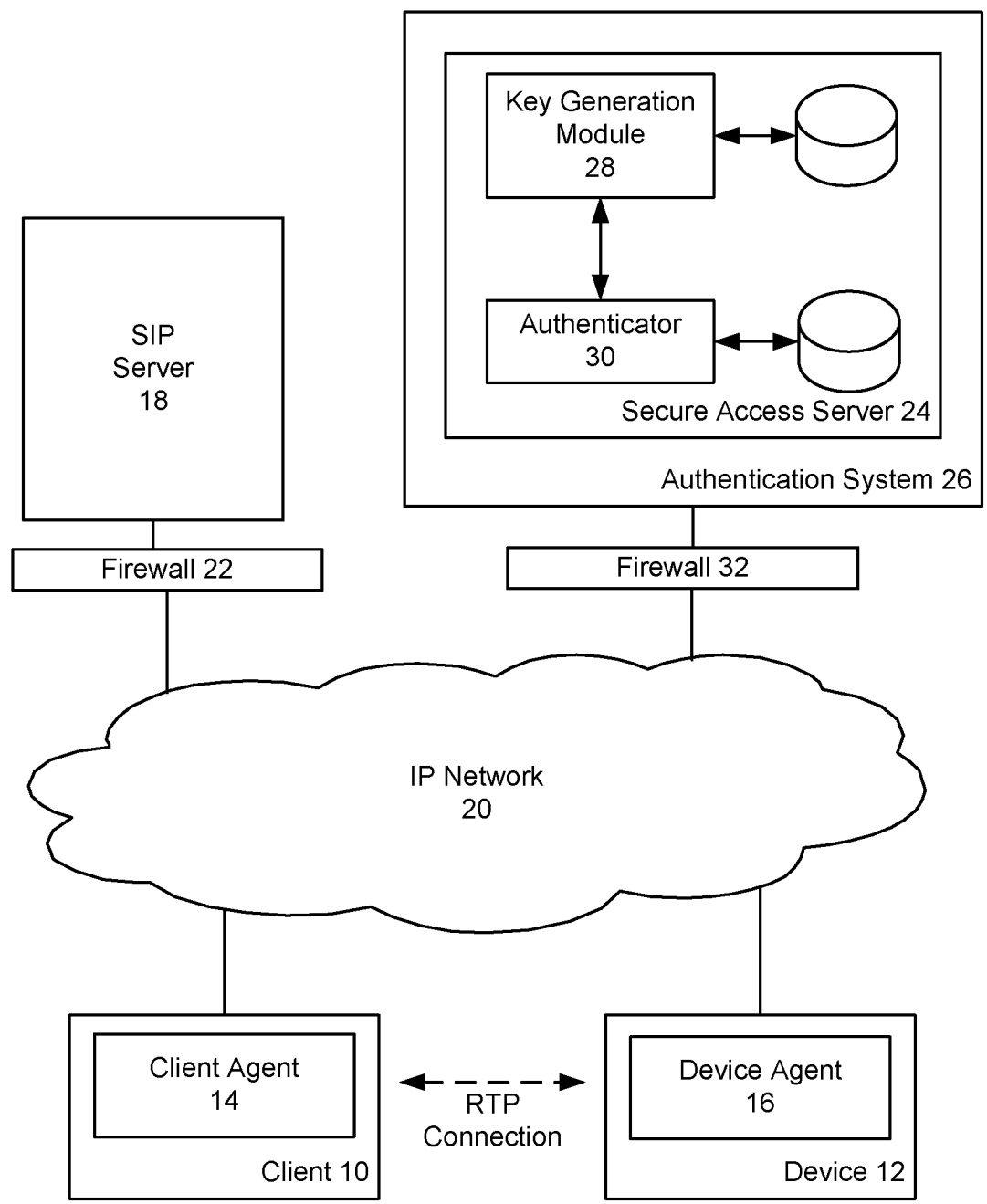
FIG. 2 shows a secure SIP architecture for providing authentication and secure access.

FIG. 2 shows a secure SIP architecture in accordance with an embodiment of the present invention. In addition to the elements described above in relation to FIG. 1, the secure SIP architecture includes a SAS 24. The SAS 24 can be a standalone element, or can be part of a larger authentication system 26, and can be included in, for example, an authentication, authorization and accounting (AAA) server. Registration, or initialization, of the user or device typically involves authentication, authorization and accounting. The authentication system 26, including SAS 24, is a server application that handles user requests for access to computer resources and provides AAA services. The SAS 24 includes a key generation module 28 to generate asymmetric private and public keys, and an authenticator 30 to authenticate the client and device agents 14, 16. The key generation module 28 and the authenticator 30 are in communication with databases to store keys and authentication information, respectively. The authentication system 26 can interact, via a firewall 32, with network access and gateway servers, home and visitor location registers, and databases and directories, such as active directories, containing user information, user profiles, billing rates, etc. Common standards by which devices or applications communicate with an AAA server include the Remote Authentication Dial-In User Service (RADIUS), and RADIUS2 or DIAMETER. The authentication system 26 need not include accounting features, nor does it need to provide any management functions other than authentication. In addition, the authentication system does not need to be provided in a single server. The authentication functions can be distributed across several servers or applications, and can be wholly or partially operated by third parties distinct from the network service provider.

The client agent 14 and device agent 16 can be organized into various modules or engines, such as modules to receive and manage private and public keys, to generate and exchange symmetric keys, and encryption and decryption engines to encrypt and decrypt messages and communications in accordance with appropriate keys.

Figure 3:
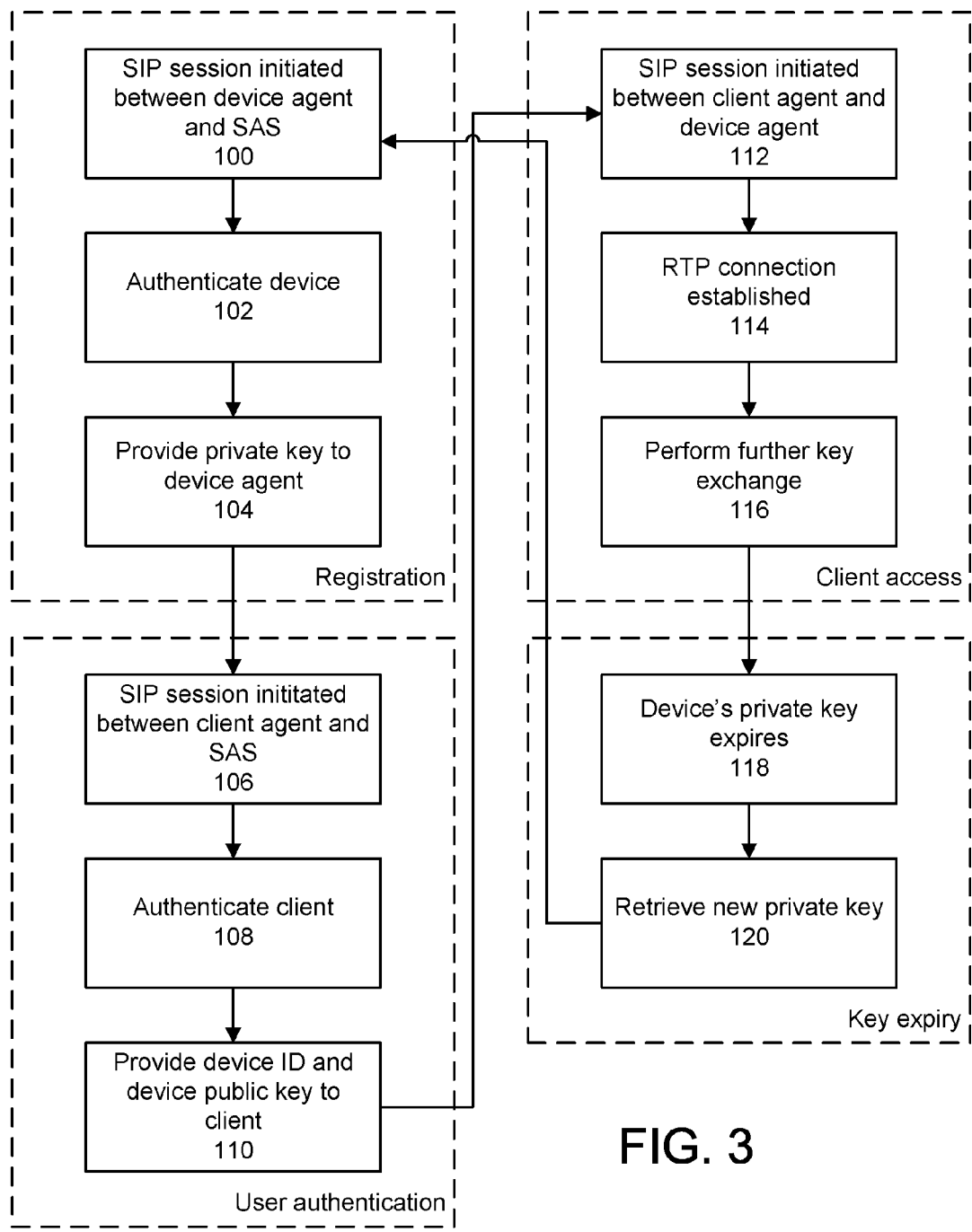
FIG. 3 is a flow chart of a method for enabling secure access between a user and a device.

The operation of the system of FIG. 2 will now be described, with reference to FIG. 3, which is a flow chart of a method for providing secure access to an IP-enabled device according to an embodiment of the invention. In a device registration phase, the device agent initiates a SIP session with the SAS 24 (100). The device's identity is authenticated by the SAS 24 (102). The SAS 24 then provides a private key to the device agent 16 (104). When a user or client 10 wishes to access the device, the client agent 14 initiates a SIP session with the SAS 24 (106), which authenticates the client (108). The SAS 24 then provides the client agent 14 with the device ID and a public key corresponding to the device's private key (110).

The client agent 14 then initiates a SIP session with the device agent 16 (112), and an RTP connection is set up between the two agents (114). Using the private and public keys provided to them, the client agent 14 and device agent 16 then perform a further key exchange (116) to permit secure communication during the SIP session. In an embodiment, the further key exchange is a one-time symmetric key exchange that permits the client and device agents to take advantage of the greater speed of symmetric-key encryption for their communication. Once the session has ended, or at another time determined by the SAS 24, the device's private key expires (118), and the device agent 16 requests and receives a new private key from the SAS 24 (120).

Figure 4A:
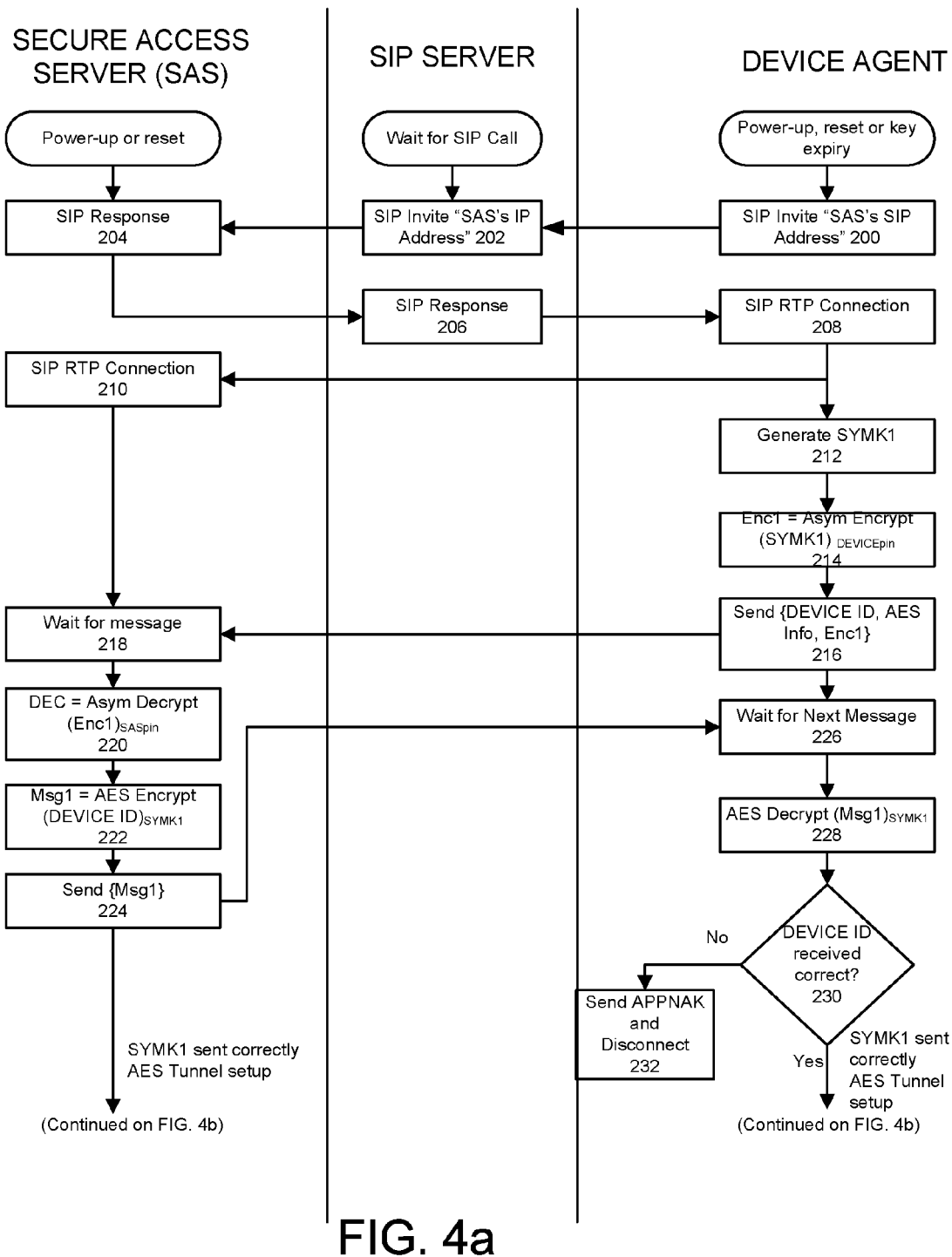
FIGS. 4a and 4b are a flow chart of a method for device registration to a secure access server.
Figure 4B:
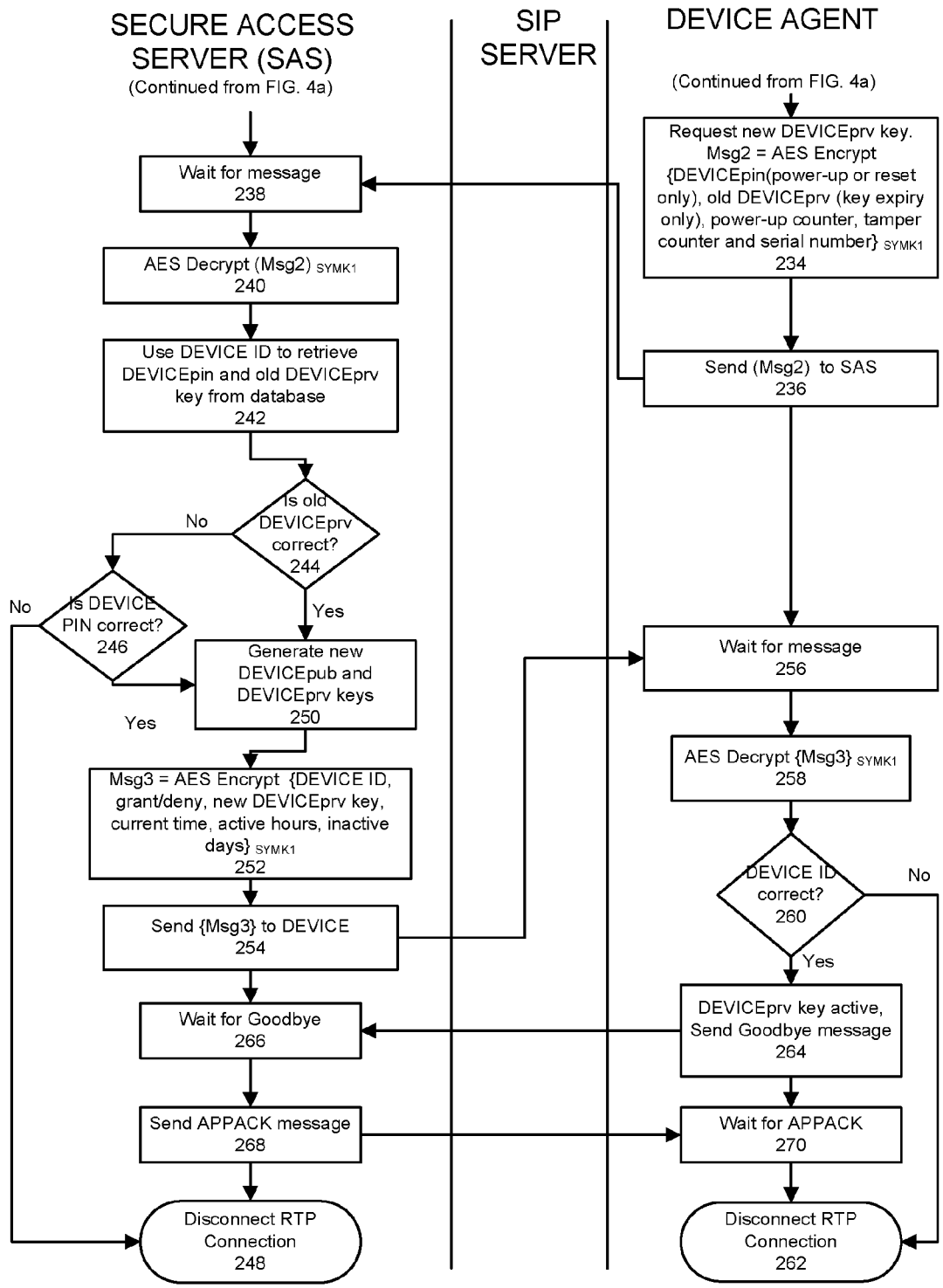

FIGS. 4a and 4b illustrate an embodiment of a protocol for the device registration phase. On power up, reset or private key expiry, the device agent 16 transmits a SIP INVITE to the SAS's IP address (200). The SIP server 18 receives the INVITE (202), and relays it to the SAS 24 (204). The SAS 24 returns a SIP response (206) to the SIP server 18, which sets up an RTP connection between the device agent 16 and the SAS server 24 (208, 210).

The device agent 16 and SAS 24 then perform a symmetrical key exchange. The device agent 16 generates a symmetric key SYMK1 (212). The device agent randomly generates the symmetric key SYMK1 for an AES Encryption/Decryption session. SYMK1 can be 128, 192 or 256 bits long. The device agent 16 then asymmetrically encrypts the SYMK1, in accordance with its DEVICEpin, to provide an asymmetric key Enc1 (214). The device agent 14 then sends its device ID, AES information and public key Enc1 to the SAS 24 (216), which is waiting for the message (218). The SAS 24 asymmetrically decrypts the key Enc1 (220), in accordance with its SASpin, to retrieve the symmetric key SYMK1. The DEVICEpin and SASpin are vendor specific identifiers provided for all devices and SAS servers. They are typically 1024-bit RSA based public keys. Using SYMK1, the SAS 24 then encrypts a message Msg1 containing the device ID (222), and sends the message Msg1 to the device agent 16 (224), which is awaiting the message (226). The device agent 16 decrypts the message Msg1 with the symmetric key SYMK1 (228), and checks to see if the received device ID is correct (230). If the device ID is not correct, the device agent sends a negative application layer acknowledgment APPNAK and disconnects from the session (232).

If the device ID is received correctly, indicating that an AES tunnel has been correctly set up, device agent 16 requests a new private key DEVICEprv from the SAS 24 (234). If the device is in power up or initialization mode, it requests the new private key by encrypting a message Msg2, containing its DEVICEpin, power up counter, tamper counter and serial number, using the symmetric key SYMK1. If the device agent 16 is requesting a new private key to replace an expired key, it encrypts a message Msg2, containing the expired key OLDDEVICEprv, the power up counter, tamper counter and serial number, using the symmetrical key SYMK1. The device agent 16 then sends the message Msg2 to the SAS 24 (236), which is awaiting a further message (238). The SAS 24 decrypts the message Msg2 (240) using the symmetric key SYMK1 (240).

Using the device ID, the SAS then retrieves the DEVICEpin or expired key OLDDEVICEprv from a database (242), and compares the retrieved values to the value provided by the device agent 16 (244, 246). If neither the expired key nor the DEVICEpin match, the RTP connection is disconnected (248), and the session ends. If the either match, the SAS 24 generates new public and private keys (250): DEVICEpub and DEVICEprv. The device ID and private key DEVICEprv are then symmetrically encrypted in a message Msg3 (252), and returned to the device agent 16 (254). Message Msg3 can also include information related to the grant and expiry of the new private key, such as the current time, the number of hours during which the key is valid, etc. The device agent 16, which is waiting for this message (256), decrypts the message Msg3 to retrieve the device ID and new private key DEVICEprv (258). If the device ID is incorrect (260), the device agent 16 ends the connection to the SAS server 24 (262); otherwise, it activates the new private key, and sends a goodbye message to the SAS server 24 (264). On receipt of the goodbye message (266), the SAS server 24 sends an application layer acknowledgment APPACK (268), which is received by the device agent 16 (270). The registration and private key exchange session is then terminated.

Figure 5:
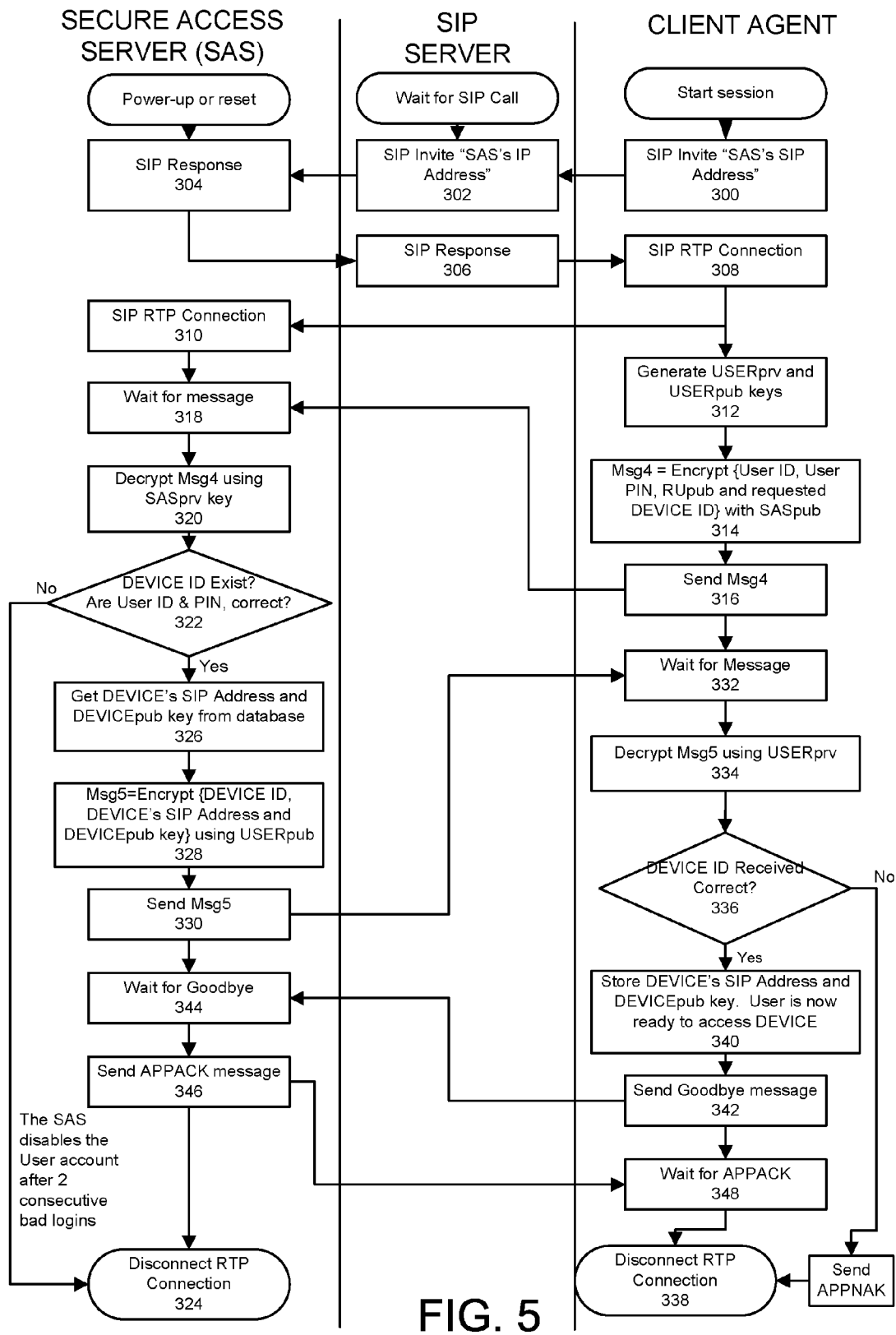
FIG. 5 is a flow chart of a method for client authentication to a secure access server.

FIG. 5 illustrates a protocol for authenticating a client 10 to the SAS 24 according to an embodiment of the invention. The authentication commences with the client agent 14 transmitting a SIP INVITE to the SAS's IP address (300). The SIP server 18 receives the INVITE (302), and sends it to the SAS 24 (304). The SAS 24 returns a SIP response (306) to the SIP server 18, which sets up an RTP connection between the client agent 14 and the SAS server 24 (308, 310).

The client agent 14 then generates asymmetric public and private keys: USERpub and USERprv (312), which can be, for example, 1024-bit public keys. The client agent 14, which has access to the SAS's public key SASpub, encrypts a message Msg4, containing its user ID, USERpin, public key USERpub, and the device ID of the device it with which it wishes to communicate (314). The client agent 14 then sends the message to the SAS server (316), which is awaiting a message (318). The SAS 24 decrypts the message Msg4, using its private key SASprv (320). The SAS checks to see if the device ID exists, and if the user ID and USERpin are valid (322). If the information does not check out, the SAS disconnects from the session (324).

If the information provided by the client agent 14 is valid, the SAS 24 retrieves the requested device's SIP address and public key DEVICEpub from an associated database (326). The SAS 24 then encrypts a message Msg5, containing the requested device ID, the device's SIP Address and the device's public key DEVICEpub, using the client's public key USERpub (328). Msg5 is then sent to the client agent (330), which is awaiting the message (332). On receipt, the client agent 14 decrypts the message Msg5 using its private key USERprv (334). The client agent 14 checks whether the received device ID is correct (336), and sends a negative application layer acknowledgment APPNAK if it is not (338), and disconnects the RTP Connection (340). If the device ID is correct, the client agent 14 stores the device's SIP Address and public key DEVICEpub (342). The client agent 14 is now ready to securely access the device, and sends a goodbye message to the SAS server 24 (342). On receipt of the goodbye message (344), the SAS server 24 sends an acknowledgment APPACK (346), which is received by the client agent 14 (348), thus terminating the user authentication session.

Figure 6A:
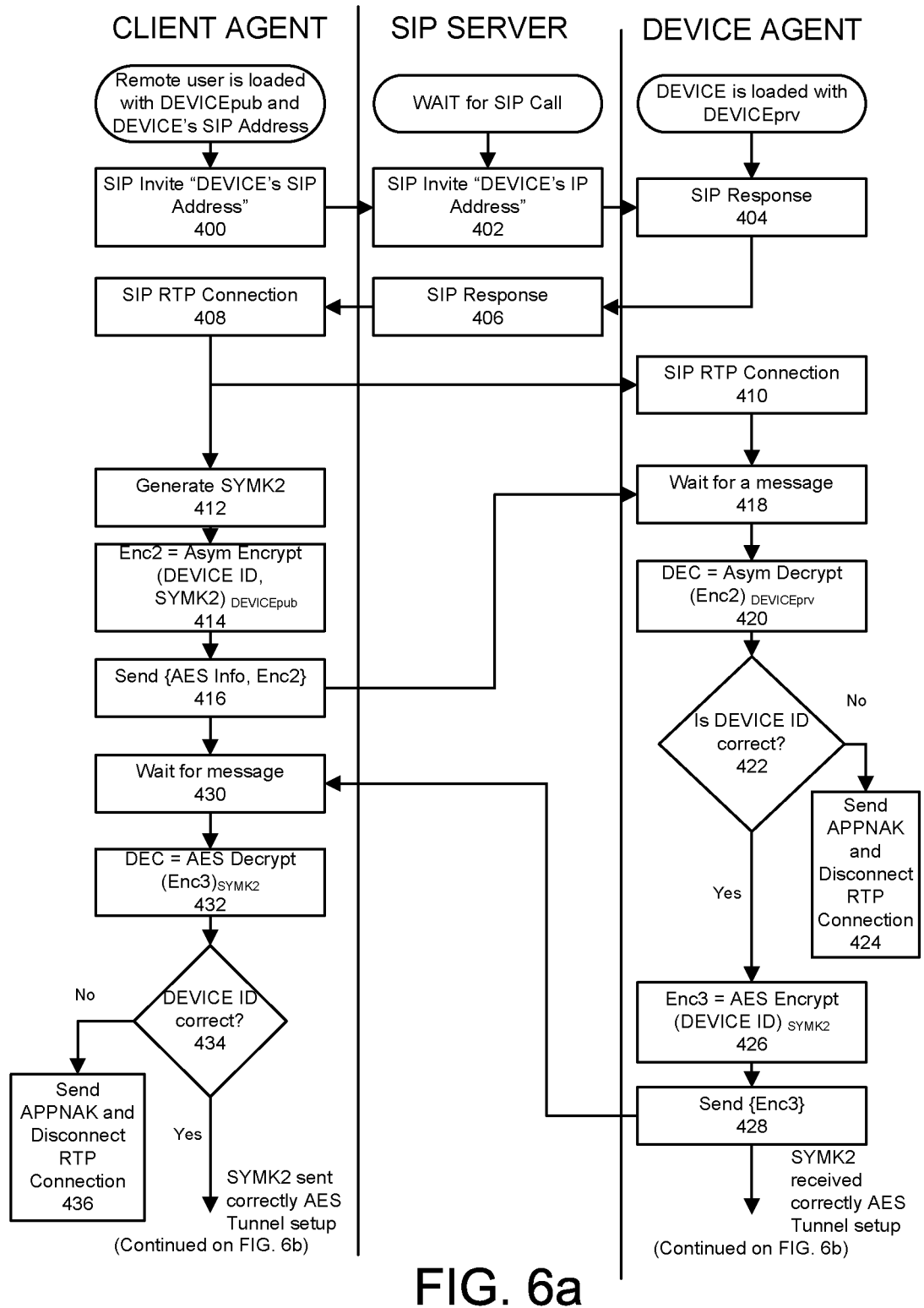
FIGS. 6a and 6b are a flow chart of a method for client access to a device after authentication to a secure access server.
Figure 6B:
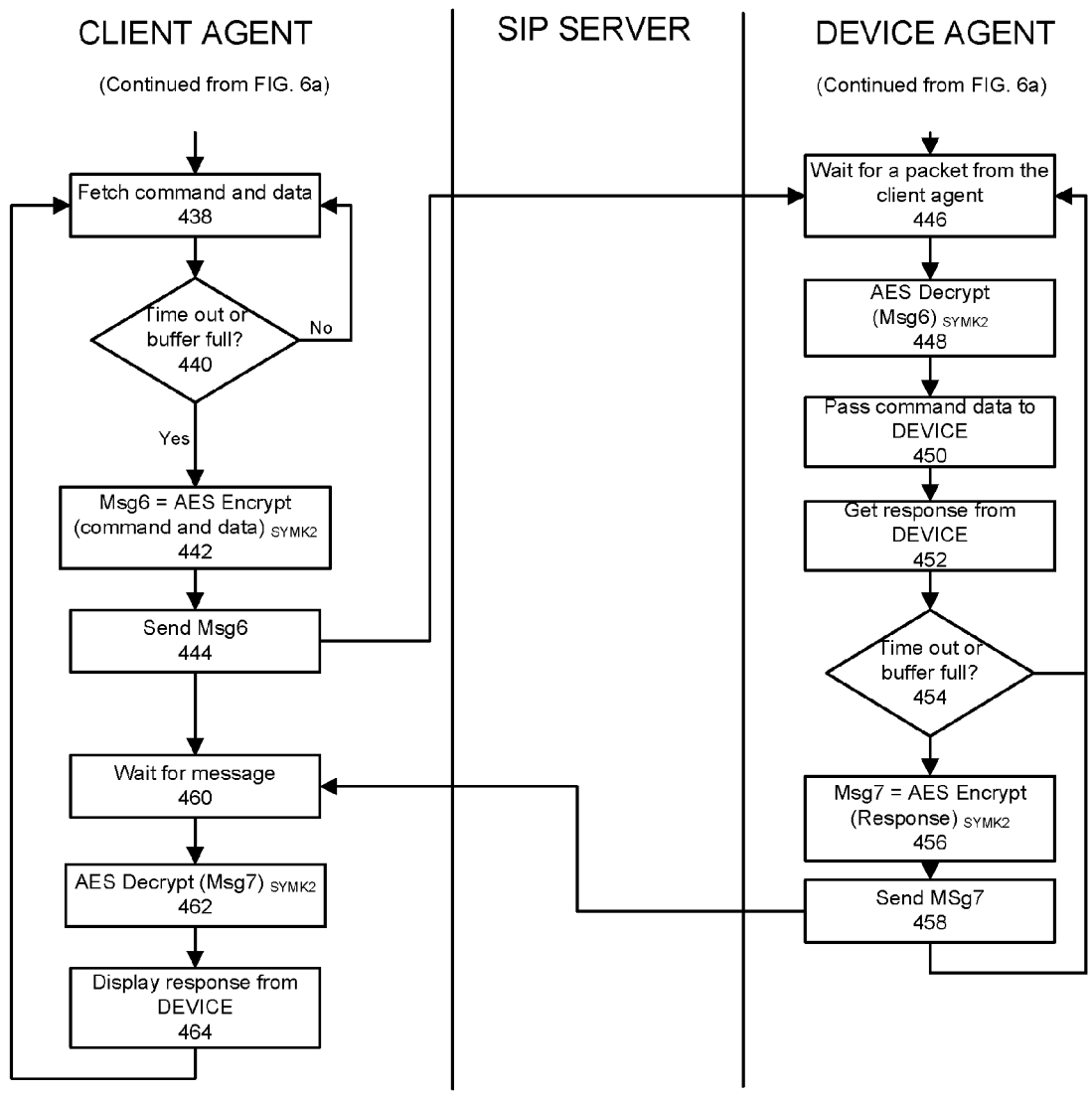

FIGS. 6a and 6b illustrate a protocol for providing a secure communication session between the client agent 14 and the device agent 16. The client agent 14 sends a SIP INVITE to the device's SIP Address (400), which is received by the SIP server 18 and sent to the device agent 16 (402). The device agent 16 returns a SIP response to the client agent 14 (404), via the SIP server 18 (406). A SIP RTP Connection is then established between the client and device agents 14, 16 (408, 410).

The client agent 14 and device agent 16 then perform a symmetrical key exchange, and set up an AES tunnel. The client agent 14 randomly generates a symmetric key SYMK2 (412) for an AES encryption/decryption session. SYMK2 can be 128, 192 or 256 bits long. The client agent 14 then asymmetrically encrypts the symmetric key SYMK2, in accordance with its public key DEVICEpub, to provide an asymmetric key Enc2 (414). The client agent 14 then sends its AES information and key Enc2 to the device agent 16 (416), which is waiting for a message (418). The device agent 16 asymmetrically decrypts the key Enc2 (420), in accordance with its private key DEVICEprv, to retrieve the symmetric key SYMK2. It should be noted that the encryption of the device's public key DEVICEpub ensures that it is never sent in the clear, so it is not really public.

The device agent 16 checks whether the received device ID is correct (422). If it is not, the device agent sends a negative application layer acknowledgment APPNAK and disconnects the RTP connection (424). If the device ID is correct, the device agent 16 performs AES encryption on the device ID, using the symmetric key SYMK2 (426), and sends the encrypted device ID to the client agent 14 (428), which is waiting for a further message (430). The client agent 14 then decrypts the message to retrieve the symmetric key SYMK2 (432), checks whether it is correct (434), and terminates the connection if it is not (436). Otherwise, the symmetric key is assumed to have been received correctly, and the AES tunnel is correctly set up.

Once the symmetric key exchange is successfully completed, the client and device agents 14, 16 are ready to communicate over the secure AES tunnel. In order to query the device 12, the user agent 14 fetches appropriate commands and data (438), and checks that it has not timed out, or that its buffer is full (440). The user agent 14 then encrypts a message Msg6, containing the commands and data, using the symmetric key SYMK2 (442). The encrypted message Msg6 is then sent to the device agent 16 (444), which is awaiting a packet or query from the client agent (446). The device agent 16 performs AES decryption on the message Msg6, using the SYMK2 key (448). In accordance with the decrypted commands and data, the device 12 is queried or polled (450), and an appropriate response is generated (452). Provided its transmit buffer is not full and it has not timed out (454), the response is encrypted as message Msg7, using the symmetric key SYMK2 (456), which is sent to the user agent 14 (458). The user agent 16, which is waiting for a response to its query (460), decrypts Msg7 using the symmetric key SYMK2 (462), and displays, or otherwise provides the decrypted response to the user (464).

As will be apparent to those of skill in the art, the present invention provides authentication of devices and clients operating in a SIP network, or other network employing a peer-to-peer signaling protocol, such as H.323. The use of public key cryptography permits the authentication of the devices and clients, while symmetric key cryptography permits quick and computationally light secure communications between the client and device. This can be particularly advantageous for devices, such as IP-enabled surveillance cameras, that require high-bandwidth communication channels to transmit large data volumes. The ability to have the private key issued to the device expire after one or more uses also reduces or eliminates the likelihood that the keys can be compromised.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of authenticating and establishing a secure communication channel between devices in a Session Initiation Protocol (SIP) network, comprising:
   registering a SIP device to a secure access server in a first SIP session, the first SIP session established between the secure access server and the SIP device, the SIP device being a first endpoint in a SIP media session, the secure access server configured to:
      authenticate the SIP device,
      generate a first asymmetric key pair comprising a first private key and a first complementary public key, the first asymmetric key pair being uniquely associated with the SIP device,
      encrypt the first private key, and
      transmit the first private key to the SIP device;
   processing a request from a SIP client to securely access the SIP device and establishing a second SIP session between the secure access server and the SIP client, the SIP client being a second endpoint in the SIP media session, the secure access server configured to, as part of processing the request or establishing the second SIP session:
authenticate the SIP client,
retrieve the first complementary public key uniquely associated with the SIP device and generated prior to receiving the request from the SIP client to securely access the SIP device, and
transmit the first complementary public key to the SIP client; and
wherein first private key and the first complementary public key are made available to the SIP device and the SIP client, respectively, before the SIP client requests secure access to the SIP device in the second SIP session;
the method further comprising:
accessing the SIP device by the SIP client in the SIP media session, the SIP media session established between the SIP client and the SIP device, wherein:
the SIP client is configured to: generate a symmetric key, asymmetrically encrypt the symmetric key using the first complementary public key previously registered to be uniquely associated with the SIP device, and transmit the encrypted symmetric key to the SIP device,
the SIP device is configured to asymmetrically decrypt the encrypted symmetric key using the first private key previously registered to be uniquely associated with the SIP device, and
the SIP client and the SIP device establish the secure communication channel by using the symmetric key for subsequent secure peer-to-peer communication between the SIP device and the SIP client during the SIP media session;
prior to a subsequent request from the SIP client to securely access the SIP device in a further SIP session, providing the SIP device with a second private key in a fourth SIP session, the fourth SIP session established between the secure access server and the SIP device, the secure access server configured to:
authenticate the SIP device,
receive a request from the SIP device for the second private key in response to expiry of the first private key,
generate a second asymmetric key pair comprising the second private key and a second complementary public key, the second asymmetric key pair being uniquely associated with the SIP device,
encrypt the second private key, and
transmit the second private key to the SIP device;
wherein providing the SIP device with the second private key in the fourth SIP session makes the second private key and the second complementary public key available to the SIP device and the SIP client, respectively, before the SIP client requests secure access to the SIP device in the further SIP session.

2. The method of claim 1, wherein the symmetric key is an Advanced Encryption Standard (AES) key and the secure communication channel is an AES tunnel.

3. A system for authenticating and providing secure communication between devices initiating communication over a Session Initiation Protocol (SIP) network, comprising:
a SIP client in communication with a SIP device, the SIP device and the SIP client being, respectively, first and second endpoints in a SIP media session, the SIP client requesting secure access to the SIP device; and
a secure access server in communication with both the SIP client and the SIP device, the secure access server configured to:
register the SIP device to the secure access server in a first SIP session, the first SIP session established between the secure access server and the SIP device, wherein registration comprises:
authenticating the SIP device,
generating a first asymmetric key pair comprising a first private key and a first complementary public key, the first asymmetric key pair being uniquely associated with the SIP device,
encrypting the first private key, and
transmitting the first private key to the SIP device;
process the request from the SIP client to securely access the SIP device and establish a second SIP session between the secure access server and the SIP client, wherein processing comprises, as part of processing the request or establishing the second SIP session:
authenticating the SIP client,
retrieving the first complementary public key uniquely associated with the SIP device and generated prior to receiving the request from the SIP client to securely access the SIP device, and
transmitting the first complementary public key to the SIP client; and
wherein the first private key and the first complementary public key are made available to the SIP device and the SIP client, respectively, before the SIP client requests secure access to the SIP device in the second SIP session, and
wherein the SIP client accesses the SIP device in the SIP media session, the SIP media session established between the SIP client and the SIP device, wherein:
the SIP client is configured to: generate a symmetric key, asymmetrically encrypt the symmetric key using the first complementary public key previously registered to be uniquely associated with the SIP device, and transmit the encrypted symmetric key to the SIP device,
the SIP device is configured to asymmetrically decrypt the encrypted symmetric key using the first private key previously registered to be uniquely associated with the SIP device, and
the SIP client and the SIP device establish the secure communication channel by using the symmetric key for subsequent secure peer-to-peer communication between the SIP device and the SIP client during the SIP media session;
and wherein the secure access server is further configured to, prior to a subsequent request from the SIP client to securely access the SIP device in a further SIP session, provide the SIP device with a second private key in a fourth SIP session, the fourth SIP session established between the secure access server and the SIP device, and the providing comprises:
authenticating the SIP device,
receiving a request from the SIP device for the second private key in response to expiry of the first private key,
generating a second asymmetric key pair comprising the second private key and a second complementary public key, the second asymmetric key pair being uniquely associated with the SIP device,
encrypting the second private key, and
transmitting the second private key to the SIP device;

wherein providing the SIP device with the second private key in the fourth SIP session makes the second private key and the second complementary public key available to the SIP device and the SIP client, respectively, before the SIP client requests secure access to the SIP device in the further SIP session.

4. The system of claim 3, wherein the symmetric key is an Advanced Encryption Standard (AES) key and the secure communication channel is an AES tunnel.

5. The system of claim 3, wherein the secure access server is encompassed within an authentication system.

6. The system of claim 5, wherein the authentication system is encompassed within an authentication, authorization and accounting (AAA) server.

7. A method of authenticating and establishing an Advanced Encryption Standard (AES) tunnel between devices in a Session Initiation Protocol (SIP) network, comprising:
registering a SIP device to a secure access server in a first SIP session, the first SIP session established between the secure access server and the SIP device, the SIP device being a first endpoint in a SIP media session, the secure access server configured to:
  authenticate the SIP device,
  generate a first asymmetric key pair comprising a first private key and a first complementary public key, the first asymmetric key pair being uniquely associated with the SIP device,
  encrypt the first private key, and
  transmit the first private key to the SIP device;
processing a request from a SIP client to securely access the SIP device and establishing a second SIP session between the secure access server and the SIP client, the SIP client being a second endpoint in the SIP media session, the secure access server configured to, as part of processing the request or establishing the second SIP session:
  authenticate the SIP client,
  retrieve the first complementary public key uniquely associated with the SIP device and generated prior to receiving the request from the SIP client to securely access the SIP device, and
  transmit the first complementary public key to the SIP client; and wherein the first private key and the first complementary public key are made available to the SIP device and the SIP client, respectively, before the SIP client requests secure access to the SIP device in the second SIP session,
the method further comprising:
accessing the SIP device by the SIP client in SIP media session, the SIP media session established between the SIP client and the SIP device, wherein:
  the SIP client is configured to: generate an AES key, asymmetrically encrypt the AES key using the first complementary public key previously registered to be uniquely associated with the SIP device, and transmit the encrypted AES key to the SIP device,
  the SIP device is configured to asymmetrically decrypt the encrypted AES key using the first private key previously registered to be uniquely associated with the SIP device, and
  the SIP client and the SIP device establish the AES tunnel by using the AES key for subsequent secure peer-to-peer communication between the SIP device and the SIP client during the SIP media session;
prior to a subsequent request from the SIP client to securely access the SIP device in a further SIP session, providing the SIP device with a second private key in a fourth SIP session, the fourth SIP session established between the secure access server and the SIP device, the secure access server configured to:
  authenticate the SIP device,
  receive a request from the SIP device for the second private key in response to expiry of the first private key,
  generate a second asymmetric key pair comprising the second private key and a second complementary public key, the second asymmetric key pair being uniquely associated with the SIP device,
  encrypt the second private key, and
  transmit the second private key to the SIP device;
wherein providing the SIP device with the second private key in the fourth SIP session makes the second private key and the second complementary public key available to the SIP device and the SIP client, respectively, before the SIP client requests secure access to the SIP device in the further SIP session.

* * * * *